No. 679,348. Patented July 30, 1901.
J. A. TURCK.
CALCULATING MACHINE.
(Application filed July 2, 1900.)
(No Model.) 8 Sheets—Sheet 1.
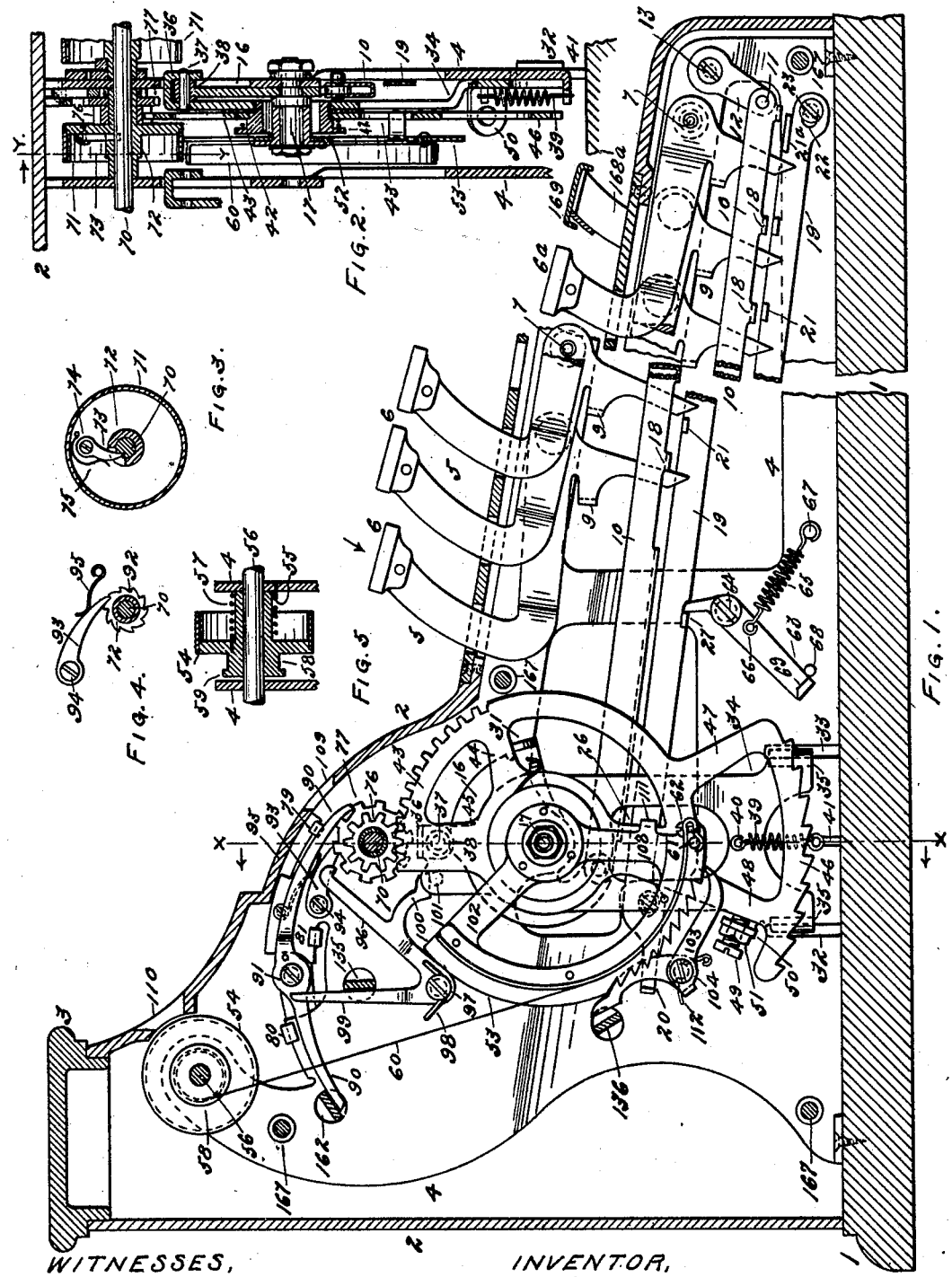
WITNESSES, INVENTOR,
Howard A. Lamprey Joseph A. Turck
Annie E. Perce BY Warren R. Perce
ATT'Y No. 679,348. Patented July 30, 1901.
J. A. TURCK.
CALCULATING MACHINE.
(Application filed July 2, 1900.)
(No Model.) 8 Sheets—Sheet 2.
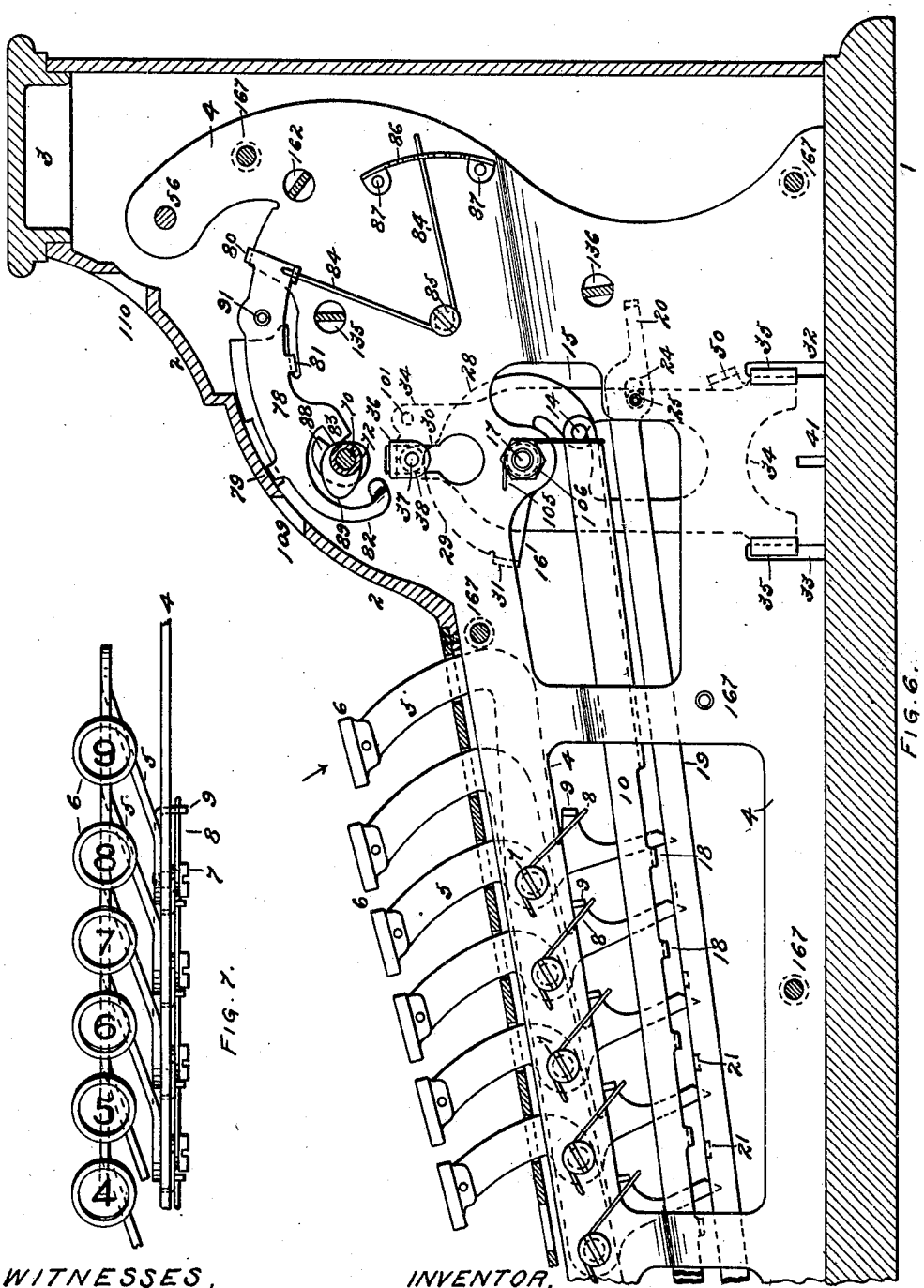

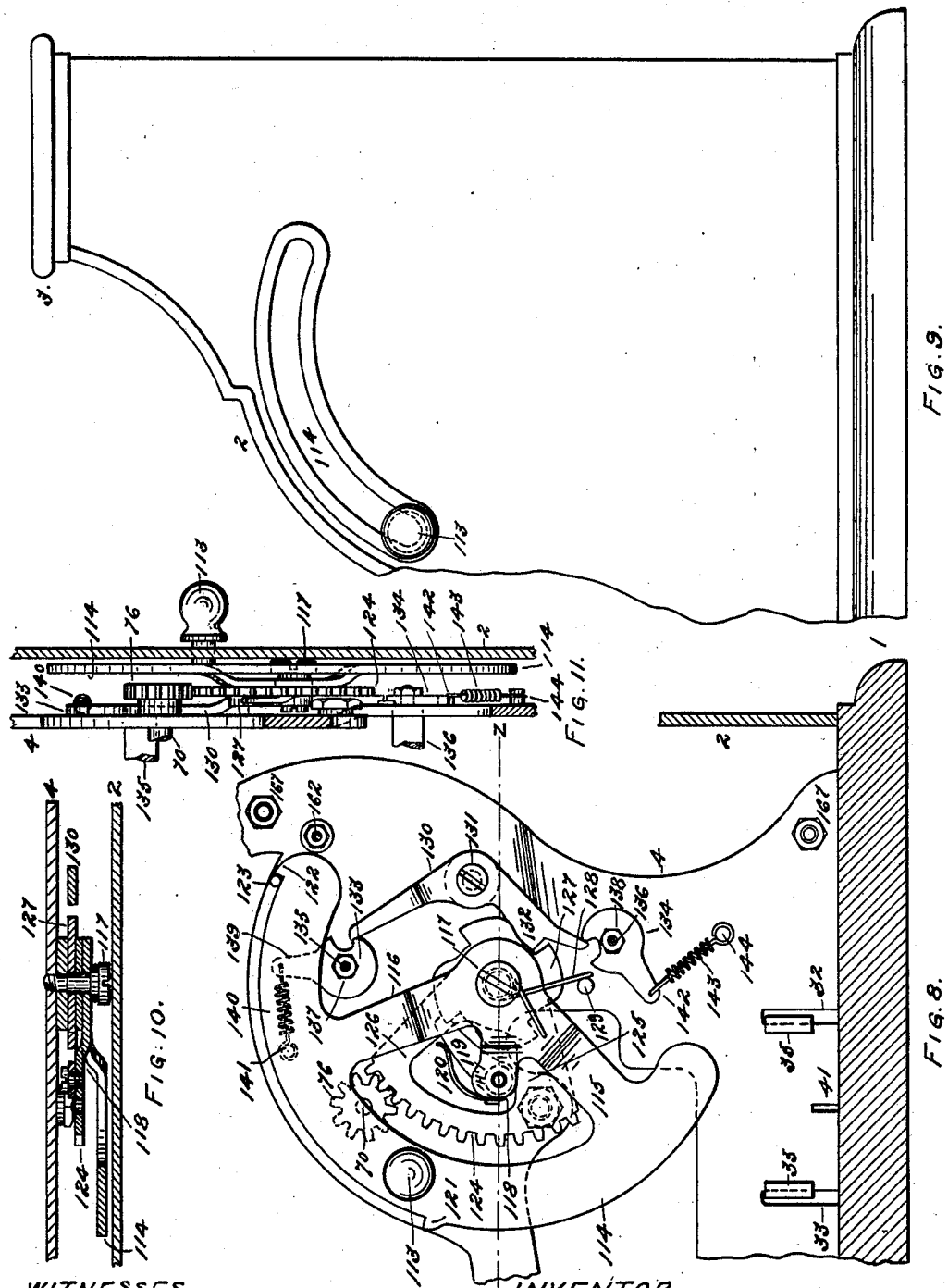

No. 679,348. Patented July 30, 1901.
J. A. TURCK.
CALCULATING MACHINE.
(Application filed July 2, 1900.)
(No Model.) 8 Sheets—Sheet 4.

WITNESSES,
Howard A Lamprey
Annie E. Perce.

INVENTOR,
Joseph A. Turck
BY Warren R. Perce
ATT'Y

No. 679,348. Patented July 30, 1901.
J. A. TURCK.
CALCULATING MACHINE.
(Application filed July 2, 1900.)
(No Model.) 8 Sheets—Sheet 5.
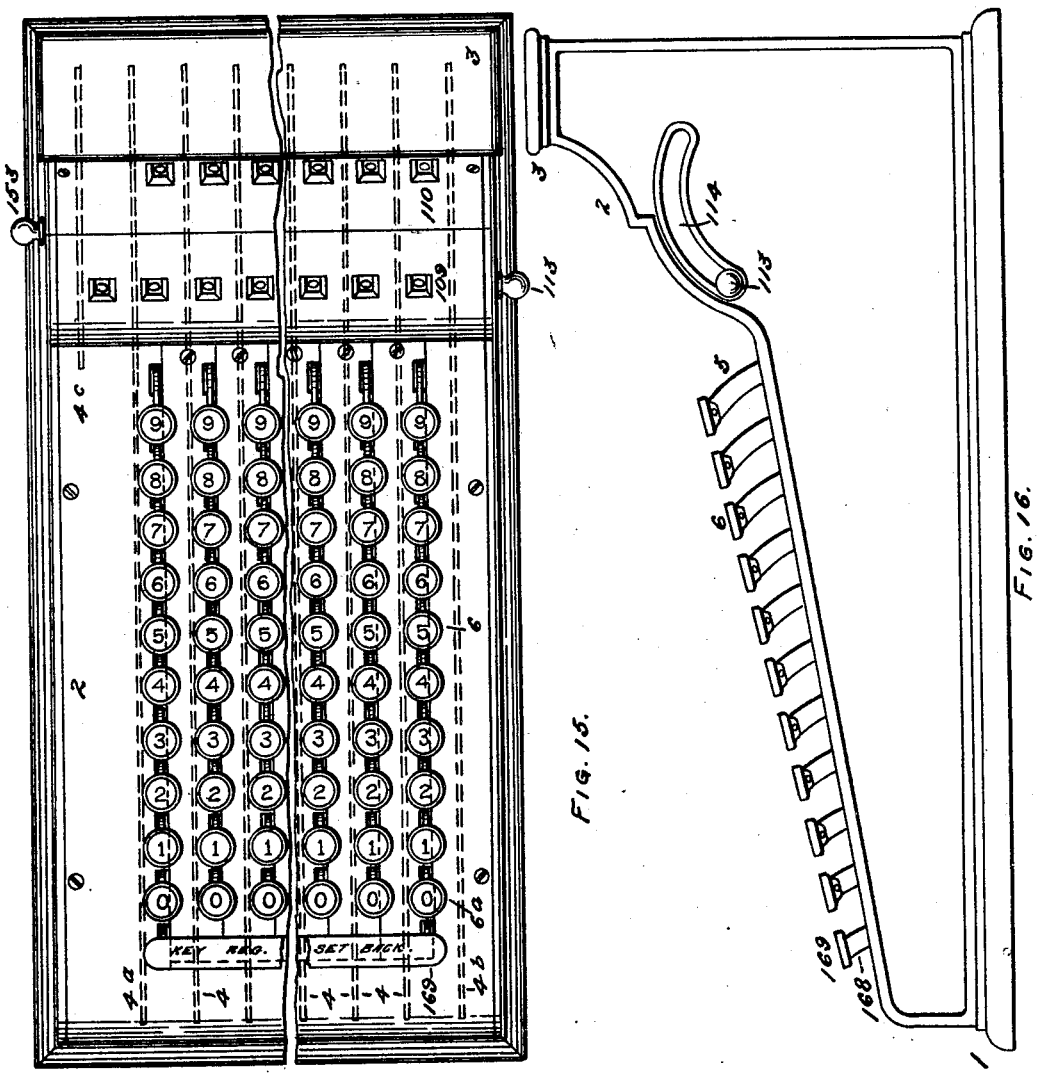
WITNESSES, INVENTOR,
Howard A Lamprey Joseph A. Turck
Annie E. Pirce BY Warren R Pirce
ATT'Y No. 679,348. Patented July 30, 1901.
J. A. TURCK.
CALCULATING MACHINE.
(Application filed July 2, 1900.)
(No Model.) 8 Sheets—Sheet 6.
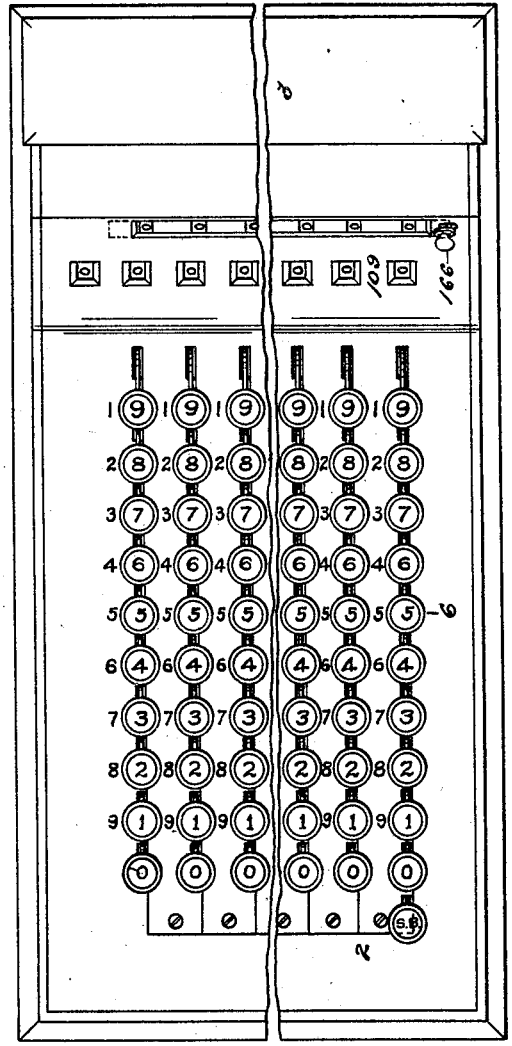
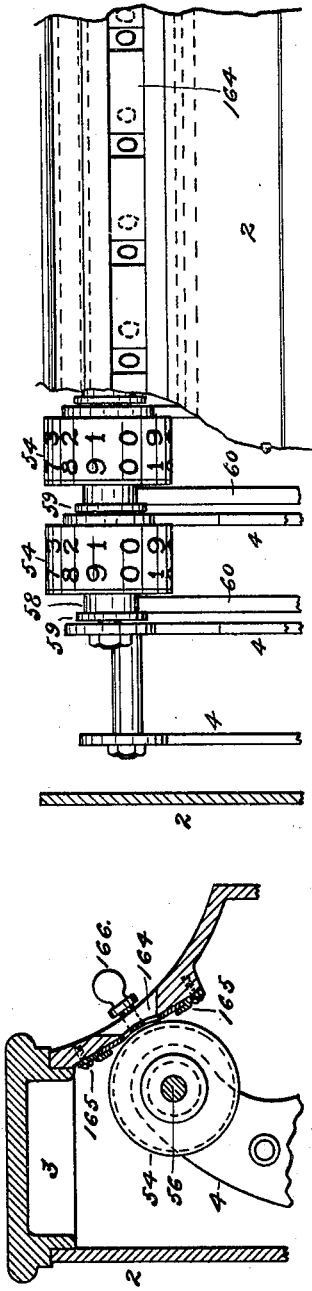
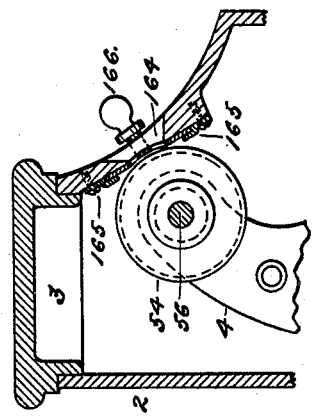
WITNESSES, INVENTOR
Howard A. Lamfrey Joseph A. Turck
Annie E. Pierce. BY Warren R. Pierce
ATT'Y.

No. 679,348. Patented July 30, 1901.
J. A. TURCK.
CALCULATING MACHINE.
(Application filed July 2, 1900.)
(No Model.) 8 Sheets—Sheet 7.

WITNESSES,
Howard A. Lamprey
Annie E. Pierce

INVENTOR,
Joseph A. Turck
BY Warren R. Pierce
ATT'Y.

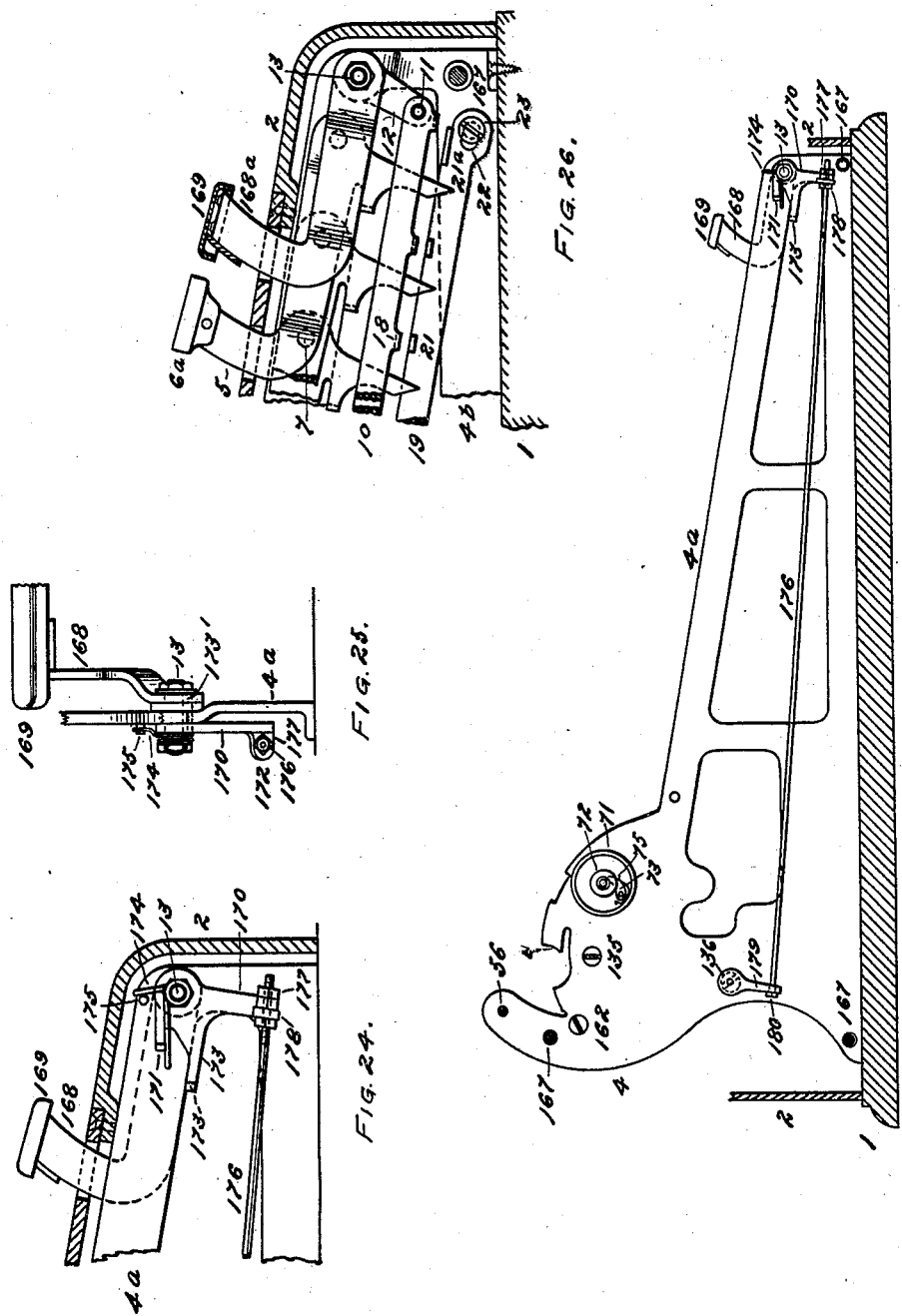

UNITED STATES PATENT OFFICE.

JOSEPH A. TURCK, OF PROVIDENCE, RHODE ISLAND, ASSIGNOR TO THE MECHANICAL ACCOUNTANT COMPANY, OF SACO, MAINE.

CALCULATING-MACHINE.

SPECIFICATION forming part of Letters Patent No. 679,348, dated July 30, 1901.

Application filed July 2, 1900. Serial No. 22,346. (No model.)

*To all whom it may concern:*

Be it known that I, JOSEPH A. TURCK, a citizen of the United States, residing at Providence, in the county of Providence and State of Rhode Island, have invented certain new and useful Improvements in Calculating-Machines, of which the following is a specification, reference being had therein to the accompanying drawings.

Like numerals indicate like parts.

Figure 13:
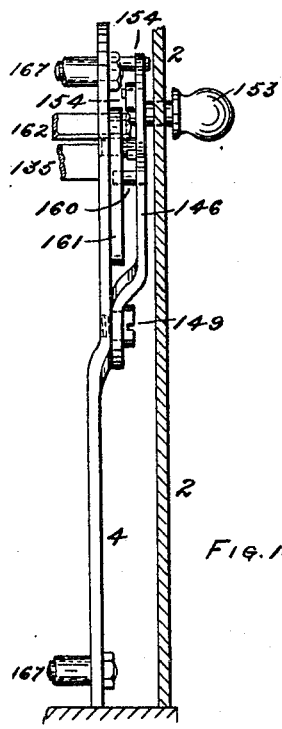
Figure 12:
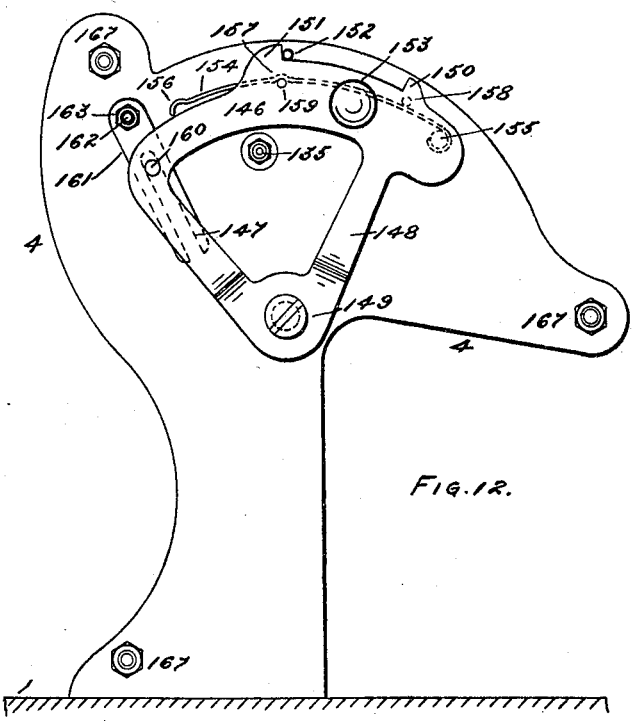
Figure 14:
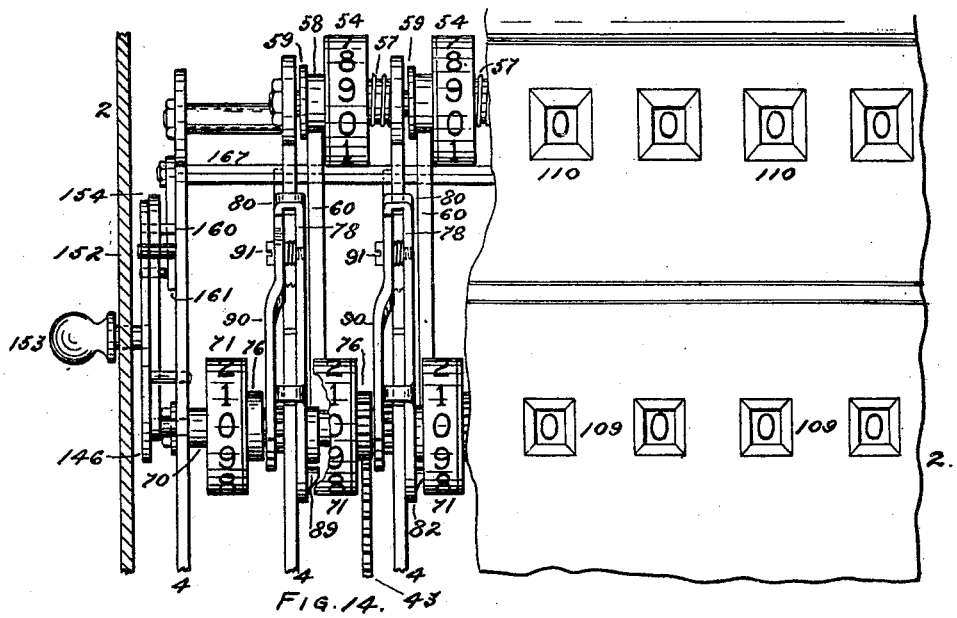
Figure 20:
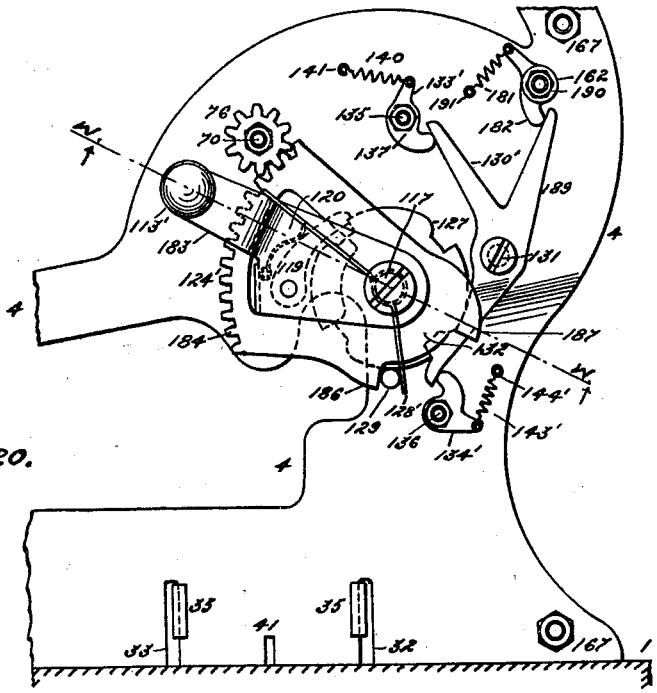
Figure 21:
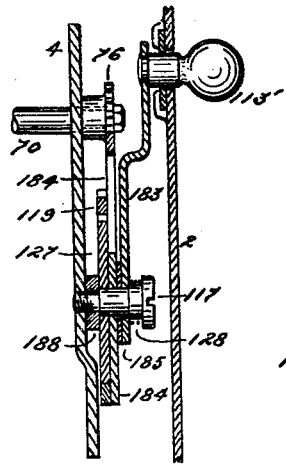
Figure 23:
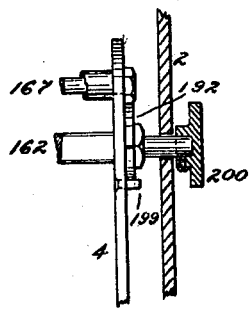
Figure 22:
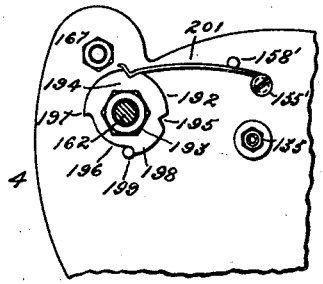

Figure 1 is a side elevation of one series of the key mechanism and the means for operating the indicating-dials and key-register dials of my improved machine. Fig. 2 is a sectional view of the same as seen on line $xx$ of Fig. 1. Fig. 3 is a view of one of the cylindrical indicating-dials as seen on section-line $y$ of Fig. 2. Fig. 4 is a view in side elevation of one of the locking-ratchets and its pawl to prevent a reverse movement of the dial, the hub of said dial, as also the shaft on which the dial is mounted, being shown in cross-section. Fig. 5 is a view in diametrical section of one of the key-register dials, the shaft on which the same is mounted being shown in elevation. Fig. 6 is a rear elevation of certain parts of the mechanism shown in Fig. 1. Fig. 7 is a detail view, in top plan, of the keys which operate the machine. Fig. 8 is an elevation of the rear right-hand side of the machine and illustrates the mechanism for setting back the dials. Fig. 9 is an elevation of the rear portion of the right-hand side of the case. Fig. 10 is a sectional view as seen on line $zz$ of Fig. 8. Fig. 11 is an end elevation of the parts shown in Fig. 8 as seen from the front. Fig. 12 is a side elevation of the mechanism for tripping the carrying devices in order to adapt the machine for calculations in subtraction. Fig. 13 is an end elevation of the parts shown in Fig. 12. Fig. 14 is a top plan view of a portion of the case and of some of the key-register and indicating dials as combined with the mechanism shown in Fig. 12. Fig. 15 is a top plan view of my improved apparatus, showing the arrangement of the keys, together with so much of the key-register dials and indicating-dials as appear through the apertures of the case. Fig. 16 is a side elevation of the case and keys. Fig. 17 is a top plan view similar to Fig. 15, except that it shows besides the keys the arrangement of the figures upon the case which are used in subtraction and also an adjustable slide adapted to expose to sight only a certain portion of the key-register dials. Fig. 18 is a detail view partly in side elevation and partly in vertical section, to illustrate one of the key-register dials and said adjustable slide in relation thereto. Fig. 19 is a view in front elevation of said key-register dials and adjustable slide. Fig. 20 shows in side elevation a modified form of the device for setting back the dials. Fig. 21 is a view of the same as seen in section on line $ww$ of Fig. 20. Fig. 22 is a side elevation of a modified form of the mechanism for disconnecting the carrying devices in order to adapt the machine for calculations in subtraction. Fig. 23 is a rear elevation of the same. Fig. 24 is a side elevation of the setback-key and its connections used in order to return the key-register dials to the zero-point. Fig. 25 is a front elevation of the same. Fig. 26 is a side elevation of the setback-bar and the mode of mounting the same in position on the right-hand end thereof. Fig. 27 is a side elevation of the left-hand end of the key or bar setback mechanism and its connections.

My invention relates to machines for adding and other mathematical calculations; and it consists of the novel construction and combination of the elements hereinafter particularly described, as set forth in the claims.

In the drawings, 1 is the base of the machine, 2 the case, and 3 a detachable cover. The machine has several series of similar parts, one of which series is to be used for each column of figures to be computed, and the description hereinafter made is of the several parts of one of said series, the others being duplicates thereof. The frame or plate supporting the moving parts of the device is designated in the drawings as 4, and its shape is best illustrated in Fig. 27. Upon the frame 4 are pivotally mounted the keys or operating-levers 5, ten in number in each series, on the upper ends of which are the heads 6, marked with numbers designating the figures required in the computation, the lower being marked "0," the next in order "1," and so on in regular course to "9," as indicated in Fig. 15. These key-levers 5 are bent, as shown in Fig. 7, and arranged so that their heads 6 lie in line. They are mounted upon the frame 4 by screws 7, and around each of said screws is wound a spring 8, having one end thereof bent to enter a hole in the frame and the other end longer and extending to the rear, Fig. 6. Each key-lever 5 has its upwardly-projecting end slightly curved and extending at an angle with its central portion, and the other end is made with a stop 9, projecting to the rear and having its extremity bent as a lip to underlie the frame 4 and against which stop the free end of the spring 8 presses. The case 2 is made with suitable apertures for the insertion of said key-levers 5.

A reciprocating swinging bar 10 is made of a strip of metal bent into a U shape in order to give it stiffness and is pivotally connected at its forward end, as shown at 11, to a rocker-arm 12, which is pivoted to the frame 4 by the stud 13. Said reciprocating swinging bar 10 at its rear end is pivotally connected, as shown at 14, to the curved arm 15 of a cam 16, as seen in Fig. 6. The cam 16 is mounted loosely on the shaft 17. On the bottom edge of the reciprocating swinging bar 10 are lugs 18, arranged at proper intervals and projecting downwardly. The short inner arm of the key-levers 5, respectively, extends to a point below the lugs 18 of the bar 10.

Below the reciprocating swinging bar 10 and substantially parallel with it is the reciprocating sliding bar 19 and ears or lugs 21 projecting therefrom at proper intervals upon one side. The bar 19 at its forward end has an elongated slot 22, through which a screw 23 passes into the frame 4, and near its rear end, Fig. 6, it has an elongated slot 24, through which a screw 25 passes into the frame 4. The bar 19 has a rearwardly-extending end 20 terminating in a bent lip, as shown in Fig. 6. The lower end of the short or inner arm of each key-lever 5 extends to a point below the lugs 21 of said sliding bar 19. On the lower edge of the sliding bar 19 is a lug 27, Fig. 1.

As seen in Figs. 1 and 6, the lugs 18 of the bar 10 are the same distance apart, while the lugs 21 of the bar 19 vary in distance, as shown, the purpose of which variation will be presently explained.

The cam 16 has the two working edges or peripheries, (shown in Fig. 6 at 28 and 29,) each of which is an arc of a circle, but the radii of which are different, and it also has the angular working edge 30 between the concentric edges 28 and 29. Said cam has a bent lip 31 at its forward corner.

On the frame 4 at the bottom thereof are the parallel ways or guides 32 33. A vertical slide 34 has at its bottom bent ears 35, movable on said guides 32 33. The slide 34 has a circular opening near its center. The upper end of the vertical slide 34 is bent over, as shown at 36 in Figs. 2 and 6, and through said bent upper end is a pin 37, upon which is a friction-roller 38. The working edges of the cam 16 are in operative contact with the roller 38 of said vertical slide 34. A spiral spring 39 has its upper end fastened upon a pin 40 of the vertical slide 34 and its lower end fastened to a stud 41 from the base 1. A flanged sleeve or tube 42, having an exterior screw-thread at one end, is screwed into the circular aperture of the slide 34, and said slide is slightly bent, as shown in Fig. 2. Upon said sleeve or tube 42 is rotatably mounted a combined gear and quadrant vertically movable with said slide 34. The gear is shown at 43 and has ten teeth. It also has the spokes or radial arms 26 44 45. Integral with (or attached to) the gear 43 is a quadrant 46, having arms 47 48, and on its periphery are nine ratchet-teeth. As seen in Fig. 2, there is a washer on the sleeve or tube 42 between the quadrant 46 and slide 34. A set-screw 49 passes through an earpiece 50, projecting from the slide 34, and a check-nut 51 holds said set-screw in place.

Loosely mounted on the shaft 17 is a flanged sleeve or tube 52, which passes through the sleeve or tube 42 and which forms the hub of the register-pulley 53. Said pulley 53 has radial spokes and a circumferential flange and one portion of the circumferential flange is formed into nine ratchet-teeth. The bore of the sleeve or tube 42 considerably exceeds the diameter of the sleeve or tube 52, as seen in Fig. 2.

A key-register dial 54 is cylindrical in shape and has a hub or sleeve 55, Fig. 5. The dial 54 is mounted on a shaft 56, which passes through the bore of the hub 55 and is supported in the frame 4. A spiral spring 57 surrounds said hub 55, one end of which spring is secured to the dial and the other end to the frame 4, as fully shown in Fig. 5. The hub 55 is enlarged at one end to form a pulley 58 and is there provided with a circumferential flange 59.

A flexible belt or ribbon 60, fastened at one end to the pulley 58 of the key-register dial 54, is wound once and a half around said pulley 58 and passes over the periphery of the register-pulley 53, and the other end of said metallic band 60 is secured to the pulley 53 between the bent-over end of the annular flange of said pulley and a pin 61 and clamped in position by the screw 62.

A stop-lever 63 is pivotally mounted on the screw 64, which passes into the frame 4. Its short upper end is engageable with the lug 27 of the sliding bar 19. A spiral spring 65 is fastened at one end to a pin 66 of the lever 63 and at the other end to a pin 67, projecting from the frame 4. A stop-pin 68 from the frame 4 limits the movement of the lever 63 in one direction. The end of the long lower arm of the lever 63 is bent to form a lip 69.

A shaft 70 passes through the machine from side to side. On the shaft 70 is mounted a cylindrical indicating-dial 71, having a tubular hub or sleeve 72, fitting loosely on said shaft 70. This sleeve or hub 72 is slotted, as seen in Fig. 3, and a pawl 73, pivoted to the inner face of the dial 71 on the screw 74 and pressed by a spring 75, passes through said slot and has its sharp end engage with a notch in the shaft 70. Fast on the hub 72 of the dial 71 is a gear 76, having ten teeth, and fast on the hub 72 of the dial 71 is also a ratchet-gear 77, having ten teeth of the peculiar form shown in Fig. 1.

In Fig. 6 is shown a curved slide 78, having bent earpieces 79, 80, and 81, by means of which it is supported on the frame 4 in an aperture made therefor and confined to a proper line of travel. The curved slide 78 has a curved recess near its forward end and a long curved arm 82. It also has a foot or projection 83, as shown. At its rear it is connected with one end of a bent spring 84, which is centrally wound about a screw 85, that projects from the frame 4. The other end of the spring 84 is engaged with some one of the slots in the detent-plate 86, the latter being secured to the frame by screws or pins 87, passing into the frame 4.

On the hub 72 of the adjacent indicating-dial 71 are two cams 88 and 89, shaped and placed as shown in Figs. 2 and 6. The working edge of the cam 88 bears against the foot 83 of the slide 78 and the working edge of the cam 89 bears against the inner edge of the curved arm 82 of the slide 78.

In Fig. 1 is shown a dog or pawl 90, fastened to the curved slide 78 by the screw 91, so as to move with it. The forward end of the dog or pawl 90 engages with the rear edge of the teeth of the ratchet-gear 77.

On the sleeve or hub 72 of the dial 71 is a ratchet-gear 92, Fig. 4. A pawl 93, pivoted to the frame 4 by the screw 94 and pressed by a spring 95, engages with said ratchet-gear 92.

A pawl 96 is pivotally mounted on the frame 4 by the screw 97, and its bent end is engageable with the front edge of the ratchet-teeth of the gear 77. A bent spring 98, one end of which is secured to the pawl 96 and the other end of which is secured to the frame 4, is wound around the screw 97. Integral with or attached to the pawl 96 is a radially-directed arm 99. The end of the arm 99 is in line to be operated by the head of the screw 91. A curved branch or arm 100 extends from the edge of the pawl 96 about midway its length, and its end rests on a pin 101 near the upper end of the vertical slide 34.

The register-pulley 53 has the spokes 102 108, and the edge of the latter is made with an ear 111, which bends over to be engaged by the spoke 26 of the gear 43, as plainly shown in Fig. 1, for the purpose hereinafter stated.

A bent lever 103 has its fulcrum on the pin or screw 104 on the frame 4, and its forward end serves as a pawl, engageable with the ratchet-teeth of the register-pulley 53. The rear end of the lever 103 is upturned. A spring 112 is wound around the screw 104 and serves to normally press the bent lever or pawl 103 into contact with the ratchet-teeth of the register-pulley.

A bent spring 105 has one end fastened to the frame 4, Fig. 6, and is wound around and held in place by the nut 106, and its opposite end, which is free, presses against the pin 14 of the curved arm 15 of the cam 16. A spiral spring (indicated in section in Fig. 2 as surrounding the tube or sleeve 42) serves to give a reverse movement to the combined gear and quadrant 43 46.

The case 2 has suitable apertures 109 and 110, through which, respectively, the indicating-dials 71 and the key-register dials 54 can be seen.

In the right-hand end of the case 2, as shown in Fig. 9, is a curved slot, in which a knob 113 is movable by the hand of the operator. This knob is connected to and moves a quadrant-slide 114, Fig. 8, which has the two arms 115 and 116 and which is pivotally mounted on the stud 117. The quadrant-slide 114 has a radial projection or pawl-holder 118, which is bent inwardly from the plane of said quadrant-slide and on which is pivotally mounted a pawl 119, pressed by a spring 120 from the end of the pawl-holder. The quadrant-slide 114 has the two stops 121 122 on its periphery, and a stop-pin 123, projecting from the frame 4, limits the movement of said quadrant-slide. Beneath the quadrant-slide 114, parallel thereto and pivotally mounted on the same screw-pivot 117, is a quadrant-gear 124, having more than ten teeth and engageable with the gear 76 on the shaft 70. The quadrant-gear 124 has the two arms 125 126, with which, alternately, the side edges of the pawl-holder 118 are adapted to contact. Beneath the quadrant-gear 124, parallel thereto and mounted on the same screw-pivot 117, is the four-time cam 127, with which the pawl 119 is engageable. A spring 128, bent around the screw-pivot 117, has one end fastened to the quadrant-slide 114 and the other end bearing against a pin 129 from the frame 4. A tripping-lever 130 is centrally mounted on a screw-pivot 131 and has a cam-surface 132 engageable with the four-time cam 127. The ends of the lever 130 bear against two disks 133 134, which are respectively secured on the rock-shafts 135 and 136 by the nuts 137 138. The disk 133 has an arm 139 extending therefrom, to which the end of a spiral spring 140 is fastened, the other end of said spring being fastened to a pin 141 of the frame 4. The disk 134 has an arm 142 extending therefrom, to which the end of a spiral spring 143 is fastened, the other end of said spring being fastened to a pin 144 of the frame 4.

The rock-shafts 135 and 136, to which the disks 133 and 134 are fastened, are flat strips, as seen in Figs. 1 and 6, and extend through the frames 4 from side to side of the case 2. The flat rock-shaft 135 bears against the arms 99 of all the pawls 96. The flat rock-shaft 136 is in close proximity with all the upturned ends of the bent levers 103, and the bent lip at the extremity of the rearward extension of each of the reciprocating sliding bars 19 is in position when said sliding bars 19 move forward to engage with the adjacent upturned end of the bent lever 103 of the same series.

To adapt my improved calculating-machine for the purposes of subtraction, the following mechanism is employed: A curved slide 146 has two radial arms 147 148 and oscillates on a screw-pivot 149, which is secured to the frame 4, Fig. 12. The slide 146 has two stops 150 151 on its upper edge, and 152 is a stop-pin from the frame 4, with which they are in contact alternately. The slide 146 has a knob 153, which projects through a slot in the case 2, as seen in Figs. 13, 14, and 15. A spring 154 is fastened to a pin 155 on the frame 4 and is made with a semicircular bend 156 at its free end and a semicircular bend 157 near its center. A pin 158 from the frame 4 tends to increase the tension of the spring 154. The slide 146 has two pins 159 and 160, the former of which is engageable with the bends 156 157 of the spring 154. A bifurcated lever-arm 161 extends from the end of the flat rock-shaft 162 at a right angle and is held thereon by the nut 163. The pin 160 of the slide 146 lies within the bifurcation of the arm 161. The flat strip 162 extends through the machine from side to side.

When my said machine is adapted to be used for the purposes of subtraction as well as addition, I make the register-dials 54 with two rows of figures, as shown in Fig. 19, one of which rows is used when the machine is worked for addition and the other for subtraction. It will be seen that in these rows on each wheel the figures are arranged in opposite orders. A slide or strip 164, having a series of perforations or sight-apertures through it, is movable upon ways 165 by means of a knob 166 and when moved exposes to sight through its apertures only that figure of the series which pertains to addition or subtraction (as the case may be) and which has been last used in the operation. As seen in Fig. 15 in dotted lines, the frames 4 of the several series lie in parallel rows and all said frames are connected and fastened together in position by rods 167, which pass through them and through the machine from side to side.

By examination of Figs. 1 and 26 it will be seen that the lower arm of the key-lever (indicated there as 6ª and which, as appears in Fig. 15, is the lever whose head is marked "0") does not strike against any lug 18 of the swinging bar 10, but does strike against a lug 21ª of the sliding bar 19. The result, therefore, of the depression of said zero-key is that it does not move the swinging bar 10 at all, and consequently does not oscillate the cam 16 nor turn the dial 71; but it does draw the sliding bar 19, thereby elevating the upturned end of the bent-lever pawl 103 and allowing the key-register pulley 53 to operate to bring the register-dial to display its zero-mark through the sight-aperture 110.

In Figs. 15, 16, 24, 25, and 27 I show a set-back mechanism for the purpose of returning all the key-register dials 54 to such position as to display their zeroes through the sight-apertures 110. A key-lever 168 is mounted pivotally upon the stud 13 and has a head or bar 169 upon the upper end. A bent lever 170 is also mounted pivotally on the stud 13 and has its upper end provided with a bent lip 171 and its lower end provided with an ear 172. An intermediate projection 173 has its end bent to underlie the lower edge of the key-lever 168. A spring 174 is wound around the stud 13 and has its upper end bearing against a pin 175 from the frame 4 and its lower end pressing up against the bottom of the bent lip 171 of the lever 170. Through the ear 172 of the bent lever 170 the end of a rod 176 passes and is secured in place by the nuts 177 178. At the opposite end of the rod 176 it is loosely connected with the end of an oscillating arm or lever 179, which is secured upon the end of the flat shaft 136. A nut 180 on said end of the rod 176 holds it to the lever-arm 179. This key-lever 168 is supported by the plate or frame 4ª, Fig. 15, on the left-hand side of the machine and may have a round head, like the other keys of the series; but, if preferred, instead of a key-head a key-bar 169 may be used, as shown. In such a construction, however, there would be necessary a bent key-lever 168ª, such as is shown in Fig. 26, in order to support the right-hand end of said key-bar 169, and such bent key-lever 168ª would be mounted on the right-hand plate or frame (marked 4ᵇ in Figs. 15 and 26) and oscillating loosely on the stud 13, (shown in Fig. 26,) having no downwardly-extending arm, as do the other key-levers. The bar 169 in this construction extends from the key-lever 168 to the key-lever 168ª, as shown in Fig. 15.

The plate or frame 4ᶜ, Fig. 15, serves simply to support the flat rock-shafts 136 162 and retain the left-hand dial in position.

Having thus described the several parts of my invention, I will now proceed to explain its operation.

It will be observed that in Figs. 1 and 6 the farthest key back (which is the key to be operated when the figure to be added is "9") is shown as somewhat depressed, indicating that the movement of that key has already begun. Previous to this movement the vertical slide 34 is at its normal position as far down as it can travel, and as the arm 100 of the pawl 96 bears down on the pin 101 of the vertical slide 34 said pawl 96 is consequently engaged with the ratchet 77, and there is no engagement of the bent lip 31 of the cam 16 with the spoke 44 of the gear 43 nor does the gear 77 engage with the gear 43; but by the time said key-lever has been depressed to the extent illustrated in Fig. 1 the following results have been accomplished, and it is at that precise instant that the parts are in the positions seen in Fig. 1. The downward pressure of the finger of the operator upon the key-head 6 of said key-lever has brought the lower portion of the short arm of said lever 5 into contact with the adjacent lug 18 of the reciprocating swinging bar 10 and as said pressure continues has drawn forward said bar 10, such movement of the bar 10 being possible because of its pivotal connection at 11 with the rocker 12, Fig. 1, and its pivotal connection at 14 with the arm 15 of the oscillating cam 16, Fig. 6. The extent of the movement or oscillation of the cam 16 determines the degree of the rotation of the indicating-dials 71. This variation of the movement of the cam depends upon the relative distance apart of that lug 18 of the swinging bar 10 from that lug 21 of the sliding bar 19, with which lugs the lower end or arm of the key-lever 5 engages, because said lever-arm moves the bar 10 by means of the engagement thereof with the lug 18 until said lever-arm has moved the bar 19 by means of its engagement with the lug 21 to such a distance that the lever 63 has engaged the corresponding tooth of the ratchet of the quadrant 46, and thus stopped the oscillation of said cam. As the bar 10 moves forward it turns the cam 16, and the friction-roller 38 of the upper end 36 of the vertical slide 34 (which at first is in contact with the working face 28 of said cam) is crowded up along the angular face 30 of the cam. This causes the vertical slide 34 to rise and by its pin 101 to lift the arm 100 of the pawl 96, thereby disengaging said pawl 96 from the ratchet 77, and it also brings the gear 43 into engagement with the gear 76. The bent lip 31 of the cam 16 at that instant comes into contact with the spoke 44 of the gear 43, and the continued turning of the cam imparts a similar motion to the gear 43 in the same direction, thereby turning the gear 76. As the gear 76 is fastened to the sleeve or hub 72 of the indicating-dial 71, said dial is correspondingly turned. Thus the depression of the ninth key results in the engagement of nine of the teeth of the gear 43 with nine of the teeth of the gear 76 and turns the dial 71 so that the figure "9" thereon is brought into position to be seen through the aperture 109 of the case 2. At the same time the extreme end of the short lower arm of the key-lever 5 coming into contact with the adjacent lug 21 of the reciprocating sliding bar 19 moves said bar slightly, (such movement being allowed by the elongated slots 22 24 of said bar as it is supported by the screws 23 25 in said slots,) and the bar 19 in so moving operates the stop-lever 63 by reason of the engagement of the upper end of said lever with the lug 27 of said bar, and the lower end of the lever 63 is thereby elevated. The quadrant 46, which is integral with or attached to the gear 43, and therefore moves with it, travels forward, and these movements of the several parts are so timed that the bent end 69 of the stop-lever 63 engages with the ninth tooth of the ratchet of said quadrant, thus stopping the quadrant and its connected gear 43. At the same time with these movements is the turning of the register-pulley 53. This pulley is moved by the spoke 26 of the gear 43, which comes into engagement with the bent lip 111 of the spoke 108 of the register-pulley 53. The turning of the pulley 53 draws the flexible belt 60, which turns the key-register dial 54 until the figure "9" thereon comes into position to be seen through the aperture 110 of the case 2. At the end of this movement the pawl 103 engages with the ninth tooth of the ratchet on the circumferential flange of the pulley 53, thus holding said pulley. The pawl 103 is actuated by the spring 112, wound around the screw 104, and the pawl 96 is actuated by the spring 98. If, for instance, the next key struck in order is the one having the figure "7" thereon, in such case the spoke 26 of the gear 43 will not quite come into contact with the bent lip 111 of the register-pulley, but will stop two spaces short of it. Then as soon as the bar 19 is moved forward by the pressure upon the key-head bearing the numeral "7" the rear end of the pawl 103 will be moved by the said movement of the bar on account of the engagement of the bent lip 20 of the end of said bar, and the forward end of the pawl 103 will be withdrawn from its engagement with the ninth tooth of the ratchet of the pulley 53. The pulley 53 then being free to move by the band 60, actuated by the pulley 58 and spring 57 of the key-register dial 54, will make a reverse movement until stopped by the contact of its bent lip 111 with the spoke 26 of the gear 43, which gear has now been moved from its normal position seven teeth by the key. When so stopped, the register-pulley 53 is there held by the engagement of the pawl 103 with the seventh tooth of the ratchet of said pulley 53, and the key-register dial 54 will turn to such position as to display the figure "7" through the aperture 110 of the case. In like manner the key-register dial 54 will always show what is the number of the last key struck, and so relieve the operator of the necessity of relying solely on his recollection as to what key he last operated. As there is but one key-register dial for each series of keys, it is obvious that said dial has both a forward and backward rotation, as may be necessary, in order that it may indicate to the operator which key of the series he last struck, the forward rotation of the key-register dial being caused, as already explained, by the drawing of the belt 60 on the pulley 58 of the key-register dial, resulting from the rotation of the pulley 53, while the backward rotation of the key-register dial is caused, as already explained, by the spring 57 of said dial when free to act until said dial is stopped by the contact of the bent lip 111 of the register-pulley 53 with the spoke 26 of the gear 43. The dial 71 is held from forward movement by the pawl 96 engaging with the ratchet 77 and from rearward movement by the pawl 93 engaging with the ratchet 72, and the dial 54 is held from forward movement by the tension of the spring 55 and from rearward movement by the pawl 103 engaging with the ratchet-teeth of the pulley 53. The reverse movement of these parts after operation is as follows: The key-lever 5 when relieved of the pressure of the operator's finger is moved back to its normal position by the spring 8, which, bearing against the key-stop 9, carries it to the point where said stop 9 comes up into contact with the under side of the frame 4. The reciprocating swinging bar 10 when relieved from the pressure of the lower end of the key-lever 5 returns to its normal position by force of the spring 105, whose end bears against the pin 14, which connects said bar 10 to the arm 15 of the cam 16, Fig. 6. The reciprocating sliding bar 19 is returned to its normal position by the force of the spring 65, which retracts the lever 63, whose upper end engages with said bar 19. The vertical slide 34 descends by the force of the spring 39, (aided by gravity,) thereby withdrawing the gear 43 from engagement with the gear 76. The gear 43 when so disengaged returns to its normal position by force of the spiral spring surrounding the sleeve or tube 42, which spring is seen in Fig. 2, and said gear is stopped in its return movement when the arm 48 of its quadrant portion 46 comes in contact with the end of the set-screw 49. The cam 16 returns to its normal position by the force of the spring 105, Fig. 6. The register-pulley 53 is returned to its normal position when its ratchet is relieved of the engagement of the pawl 103 by the force of the spiral spring 57, surrounding the hub 55 of the key-register dial 54, the band 60 being wound thereby upon the pulley 58 of said dial 54, and so turning the pulley 53, on which said band 60 is also wound, until the bent lip 111 of the spoke 108 of the pulley 53 bears against the spoke 26 of the gear 43.

The mechanism for carrying the tenth unit over to the tens column of figures, the tenth ten over to the hundreds column, and so on, operates as follows: The cam 88 of the sleeve 72 of the indicating-dial 71 on the shaft 70 (see Fig. 6) bearing against the projection 83 of the curved slide 78 moves said slide 78 to the rear, whereupon the head of the screw 91, which connects the slide 78 and the dog or pawl 90, bears against the arm 99 of the locking-pawl 96 and disengages said pawl from the ratchet 77, and at the same time the forward end of the dog or pawl 90 is retracted and moved into position to operate when allowed that tooth of the ratchet 77 which is next in order to the rear. As soon as the end of the cam 88 has slipped off from the projection 83 of the curved slide 78 the slide 78 returns by force of the spring 84, and as the dog or pawl 90 moves with said slide, because of the screw 91, which connects them, the forward end of the dog or pawl 90 pushes the ratchet 77 forward one tooth. As the ratchet 77 is fast upon the hub or sleeve of the adjacent dial 71, said dial is thus advanced one number, which shows through the aperture 109 of the case. The tension of the spring 84 can be varied by engaging the lower end with whichever slot of the detent-plate 86 may be desired. The function of the cam 89 is to accomplish this same carrying movement, bearing, as it does, on the end of the curved arm 82 of the slide 78 and is a safety device to insure the result if for any reason the spring 84 should fail to operate.

The mechanism for setting back all the dials 71 and 54 to the zero-points operates as follows: By moving the knob 113 back the quadrant 114 turns on its screw-pivot 117 until the projection 121 of said quadrant abuts the stop-pin 123. This movement of the quadrant 114 carries forward the arm or pawl-holder 118, and the pawl 119 so actuated moves the four-time cam 127 a quarter-turn. This quarter-turn of the cam 127, one arm of which bears against the cam-surface 132 of the tripping-lever 130, causes said lever at the same time to move the disks 133 134, which being fastened on the ends of the flat rock-shafts 135 and 136, respectively, turn said rock-shafts. The rock-shaft 135 in so turning bears against the arm 99 of each pawl 96, thus lifting said pawls 96 from their engagement with the ratchets 77, respectively. The rock-shaft 136 in so turning presses forward the upturned ends of all the bent levers or pawls 103. As the ratchet-teeth of the flanges of all the register-pulleys 53 are then relieved from the pawls 103 the springs 57, surrounding the hubs 55 of the key-register dials 54, turn said dials 54 until the zero-points of said dials appear through the apertures 110 of the case, and this return of the dials 54 to their normal position draws, by means of the bands 60, the pulleys 53 to their normal position. When the lever 130 has thus relieved by said action the ratchets 77, the continued rearward movement of the quadrant 114 actuates the gear 124 as soon as the rear edge of the pawl-holder 118 comes into contact with the front edge of the arm 126 of said gear 124. The rearward movement of the gear 124 so caused turns the gears 76. These gears 76 turn the shaft 70, and when the pawls 73 of the dials 71 engage, respectively, in the grooves or notches of said shaft 70 by force of the springs 75 the continuing reverse rotation of said shaft 70 turns all the dials 71 so that their zero points appear through the apertures 109 of the case 2. This rotation of the shaft 70, however, it will be seen, does not begin until the locking-pawls 96 have been disengaged from the ratchets 77 and the pawls 103 have been disengaged from the ratchets of the register-pulley 53. As soon as the pressure of the operator's fingers upon the knob 113 is removed the quadrant 114 returns to its normal position by force of the spring 128 until the stop 122 of said quadrant abuts the pin 123 of the frame 4, and this reverse movement of the quadrant 114 carries with it the pawl-holder 118 and brings the pawl 119 into position in front of the next section of the four-time cam 127. The edge of the pawl-holder 118 then coming in contact with the arm 125 of the gear 124 causes the gear 124 to move to its original position. This movement of the gear 124 turns the gears 76 and also the shaft 70, to which said gears are attached; but such rotation of the shaft 70 is not prevented by the pawls 73 of the dials 71, Fig. 3, because of the direction of said pawls, as shown. The form and timing of the cam 127 are such that the section thereof which is in engagement with the cam-surface 132 of the tripping-lever 130 slips off from the cam just as the gear 124 has about completed its advance, whereupon the springs 140 and 143 are free to act, and the disks 133 and 134 being no longer held by the lever 130 yield to the force of said springs and turn the flat rock-shafts 135 and 136 to the positions thereof seen in Figs. 1 and 6.

By operating the mechanism shown in Figs. 12 and 13 the machine is adapted for calculations in subtraction or division. By pushing backward the knob 153 the slide 146 is moved on its pivot 149, the pin 159 is disengaged from the central bend 157 of the spring 154, and said slide continues its movement until stopped by the contact of its projection 150 with the pin 152, at which time the bend 156 of the spring 154 is in position to receive the pin 159 of said slide. This movement of the slide 146 causes the pin 160 to push against and move the lever-arm 161, within whose slotted end it projects, and said arm being fastened to the end of the flat shaft 162 partially rotates the same, thereby depressing the rear end of the pawl 90, Fig. 1, and lifting the front end of said pawl 90 out of engagement with the ratchet 77. The result of these mechanical movements is that the carrying mechanism which is necessary in the adding operations is disconnected, so that the indicating-dials 71 have no means of affecting each other *seriatim*, as before.

For calculations in subtraction or division the figures are used which appear on the case 2 at the sides of the keys, respectively, as illustrated in Fig. 17, (or which, if desired, may be smaller in size and placed on the key-head beside the principal figure thereon,) instead of those which appear on the key-heads, and the slide 164 should be moved by the knob 166 so that the row of figures on each of the register-dials 54 which have been used in the process of addition shall be concealed and the other row of figures on each of said register-dials 54 shall be exposed through the sight-apertures of said slide 164. I will now explain how said disconnection of the carrying mechanism and the use of the figures on the case instead of those on the key-heads adapts the machine to problems in subtraction. Let us suppose that it is desired to subtract seven hundred and thirty-six from nine hundred and eighty-one. The operator strikes that key of the right-hand row which is marked "1," then that key of the next row which is marked "8," and then that key of the next row which is marked "9." The indicating-dials then show the figures "981" through the sight-apertures 109, Fig. 17. This number is the minuend. From this it is desired to subtract seven hundred and thirty-six. On the case the figure "6" on the right-hand row is next to the key-head marked "4." (See Fig. 17.) The operator presses this key as if he were adding 4+1=5. The figure "5" appears at the right-hand sight-aperture 109. The next figure of the subtrahend is "3." In the first operation, however, as six could not be taken from one one must be borrowed from the tens, which is the same as reducing the eight of the minuend to seven or increasing the three of the subtrahend to four, as in arithmetic. The operator chooses the latter method and considers the tens of the subtrahend to be four instead of three. The figure "4" on the case in the second row is next to the key-head marked "6" in that row. The operator presses that key as if he were adding 6+8=14; but as the carrying mechanism is detached only the "4" is indicated on the dial of this row and the figure "4" appears at the second sight-aperture 109. The next figure of the subtrahend is "7," and this on the third row is next to the key-head marked "3." The operator presses this key as if he were adding 3+9=12; but as the carrying mechanism is detached only the figure "2" is indicated on the dial of that row. The dials, which at first read "981," now read "245," which is the answer. In calculating problems in division the carrying mechanism is not disconnected; but in the operation the figures are used which are on the case beside the key-heads, as in subtraction. Let us suppose that it is desired to divide one hundred and seventy-nine by four. "179" is the dividend, and it is set upon the indicating-dials by the operator pressing the key-head marked "1" on the third row from the right, the key-head marked "7" on the second row from the right, and the key-head marked "9" on the right-hand row. The divisor to be used is "4." "4" on the case is beside the key-head marked "6." As four is greater than one, no operation is to be performed on the column in which the "1" stands. The operator then proceeds to the second row from the right—the row beneath the figure "7" of the dividend. As four is less than seven and the third indicating-dial from the right shows "1," he presses the key on the second row which is opposite to the figure "4" on the case. This key is the adding-key "6." 6+7=13. The third indicating-dial then shows "2" and the second dial "3." Now as the third dial shows "2" and he has struck said key only once he strikes said key again. 6+3=9. The third dial remains at "2" and the second dial shows "9." As four is less than nine, he presses said key again. 6+9=15. The third dial then shows "3" and the second dial "5." As four is less than five, he presses said key again. 6+5=11. The third dial then shows "4," and the second dial shows "1." As four is greater than one, he leaves that column and passes to the right-hand column, operating there the key which is opposite to the figure "4" on the case, but which is the adding-key "6." As the second dial shows "1," he presses said key once. 6+9=15. The second dial then shows "2" and the third dial shows "5." As four is less that five, he presses said key again. 6+5=11. The second dial then shows "3" and the third dial "1." As the second dial shows "3" and he has pressed said key only twice, he presses said key again. 6+1=7. The second dial remains at "3," and the third dial shows "7." As four is less than seven, he presses said key again. 6+7=13. The second dial then shows "4" and the third dial shows "3;" but as four is greater than three there is no further operation required and "3" is the remainder. The dials which at first showed "179" now show "443"—that is, the quotient "44" and "3" remainder, which is the answer. In other words, the rule in simple division is as follows: (a) Set all the indicating-dials back to zero; (b) set the indicating-dials so that they show the figures which constitute the dividend; (c) begin with the left-hand figure of the dividend, if that figure is greater than the divisor; (d) in the row beneath the left-hand figure of the dividend select that key on the left-hand side of which upon the case is the figure equal to the divisor; (e) strike said key as many times as are necessary until the dial above said key shows a figure less than the divisor and said key has been struck as many times as are equal to the number shown on the preceding dial next on the left; (f) then proceed to operate on the next (the second) figure of the dividend and select that key in the row beneath said second figure of the dividend on the left-hand side of which key upon the case is the figure equal to the divisor; (g) strike said key as many times as are necessary until the dial above said key shows a figure less than the divisor and said key has been struck as many times as are equal to the number shown on the preceding dial next on the left; (h) proceed in like manner with each succeeding figure of the dividend, and at the end of the operations the figure shown on the right-hand dial will indicate the remainder and the figures shown on the preceding dials will indicate the quotient. If, however, the first figure of the dividend is less than the divisor, follow the foregoing rule, beginning with the clause marked "f." The reverse movement of the flat rock-shaft 162 is caused by reversing by hand the slide 146, operated by the knob 153. In said Fig. 20 I show a modified form of the mechanism for setting back at once all the indicating and key-register dials and at the same time operating the flat strip 162 to allow the pawls 90 to come into engagement with the ratchet 77 in case the machine has just been used in subtraction. Here I dispense with the quadrant-slide shown in Fig. 8 and use instead a lever-arm 183 of the shape illustrated in Fig. 20 and pivoted on the screw 117. A spring 128' has its upper end bearing against the upper edge of the lever-arm 183, and its lower end enters the frame 4. At the outer end of the lever-arm 183 is a knob or handle 113', which passes through the case 2. A sector-shaped gear 184, having more than ten teeth, is also mounted on the screw 117, a washer 185 being interposed between it and the lever-arm 183, as seen in Fig. 21. The sector-shaped gear 184 has the projections 186 187, which serve as stops to limit the movements of said gear by coming in contact with the pin 129. A washer 188 on the screw 117 is placed between the cam 127 and the frame 4. The bent tripping-lever 130', mounted on the screw-pivot 131, has the arm 189 extending angularly therefrom. On the end of the flat rock-shaft 162 is the lever-arm 182, secured thereto and held by the nut 190, the lower end of said lever-arm 182 being in contact with the angular arm 189 in case the machine is set for subtraction, and the upper end being provided with a spring 181, whose outer end is fastened on a pin 191 from the frame 4. The end of the flat rock-shaft 136 has a bent lever 134', whose upper end bears against the lower end of the tripping-lever 130' and whose outer end has the spring 143' connected therewith, said spring being fastened on the pin 144' of the frame 4. The movements of this modified form of the setback mechanism are the same as already described, except that by reason of the addition of the angular arm 189 the flat rock-shaft 162 is operated as well as the dials 54 and 71 in case the machine has been used for subtraction, but not otherwise.

In Figs. 24 to 27, inclusive, I show how the setback mechanism for returning all the key-register dials to their zero-points may be operated by a key 168 169. From the lower end of the lever 170, which is operated by the key-lever 168, a rod 176 extends to an arm 179 of the flat rock-shaft 136. The depression of said key-lever 168 therefore rocks the shaft 136, and said shaft in turning enables the key-register dials to return to their normal position, as hereinbefore described.

In Figs. 22 and 23 I show a modified form of the mechanism for disengaging the pawls 90 from the ratchets 77, which is necessary when the machine is used for subtraction. In this modified form a disk 192 of the peculiar shape shown in Fig. 22 is fastened by the nut 193 on the end of the flat rock-shaft 162. On the edge of this disk 192 are two notches 194 195, and the portion 196 of said edge is reduced diametrically, so as to leave the two stops or projections 197 198, which alternately coming into contact with the pin 199 of the frame 4 limit the movement of said disk 192. The rock-shaft 162 is turned by the thumb-screw 200. A spring 201, having a V-shaped bend to engage with either of the notches 194 or 195, is secured at one end to the frame 4 by a screw 155' and gets a tension by its bearing on the pin 158'. By turning the thumb-screw 200 the flat rock-shaft 162 is moved and disengages the carrying mechanism, as already described.

I claim as a novel and useful invention and desire to secure by Letters Patent—

1. In a calculating-machine, the combination of a pivotally-mounted key-lever having a downwardly-extending end, a reciprocating swinging bar pivotally connected at its front end with a properly-mounted rocker-arm and provided with a lug against which said end of the key-lever is movable, a cam rotatably mounted on a fixed support and pivotally connected with the rear end of said swinging bar, a vertically-movable supporting-piece having suitable guides and provided with a projection in contact with the working face of said cam, a gear mounted on said vertically-movable supporting-piece and means to rotate said gear, a properly-mounted shaft, a gear loose on said shaft engageable with the first-named gear when said movable supporting-piece is in its elevated position and a cylindrical dial mounted on said shaft and movable by the second-named gear, all arranged and operating substantially as and for the purpose specified.

2. In a calculating-machine, the combination of a pivotally-mounted key-lever having a downwardly-extending end, a reciprocating swinging bar pivotally connected at its front end with a properly-mounted rocker-arm and provided with a lug against which said end of the key-lever is movable, a cam rotatably mounted on a fixed support and pivotally connected with the rear end of said swinging bar, a spring adapted to give a return movement to said cam, a vertically-movable supporting-piece having suitable guides and provided with a projection in contact with the working face of said cam, a gear mounted on said vertically-movable supporting-piece and means to rotate said gear, a properly-mounted shaft, a gear loose on said shaft engageable with the first-named gear when said movable supporting-piece is in its elevated position and a cylindrical dial mounted on said shaft and movable by the second-named gear, substantially as described.

3. In a calculating-machine, the combination of a pivotally-mounted key-lever having a downwardly-directed end, a reciprocating swinging bar pivotally connected at its front end with a properly-mounted rocker-arm and provided with a lug against which said end of the key-lever is movable, a slide vertically movable in suitable ways and having a central aperture in which is secured a short tube, a friction-roller rotatably mounted on a projection of said slide, a shaft passing through said tube but of a less diameter than said tube, a cam rotatably mounted on said shaft and having working edges adapted to contact with said friction-roller for the purpose of vertically moving said slide and also having a pivotal connection with the rear end of said swinging bar, a spring adapted to give a return movement to said cam, a gear loosely mounted on said tube, means between said cam and gear adapted to impart a rotary movement from the former to the latter, a spring adapted to give a return movement to said gear, a properly-mounted shaft, a gear loose on said last-named shaft engageable with the first-named gear and a cylindrical dial mounted on the last-named shaft and movable by the second-named gear, substantially as specified.

4. In a calculating-machine, the combination of a pivotally-mounted key-lever having a downwardly-extending end, a reciprocating swinging bar pivotally connected at its front end with a properly-mounted rocker-arm and provided with a lug against which said end of the key-lever is movable, a slide vertically movable in suitable ways and having a central aperture in which is secured a short tube, a friction-roller rotatably mounted on a projection of said slide, a shaft passing through said tube but of a less diameter than said tube, a cam rotatably mounted on said shaft and having working edges adapted to contact with said friction-roller for the purpose of vertically moving said slide and also having a pivotal connection with the rear end of said swinging bar, a spring adapted to give a return movement to said cam, a gear loosely mounted on said tube, means between said cam and gear adapted to impart a rotary movement from the former to the latter, a spring adapted to give return movement to said gear, a quadrant extending from said gear and movable with it and having ratchet-teeth on its periphery, a properly-mounted shaft, a gear loose on said last-named shaft, engageable with the first-named gear, a cylindrical dial mounted on the last-named shaft and connected with and movable by the second-named gear, a reciprocating sliding bar with supports for the same and provided with a lug on its upper edge against which said end of the key-lever is movable and also provided with a lug on its lower edge, a centrally-mounted lever having its upper end engageable with the last-named lug and its lower end engageable with the ratchet-teeth of said quadrant, and a spring adapted to give return movement to said lever, substantially as set forth.

5. In a calculating-machine, the combination of a pivotally-mounted key-lever having a downwardly-extending end, a reciprocating swinging bar pivotally connected at its front end with a properly-mounted rocker-arm, and provided with a lug against which said end of the key-lever is movable, a slide vertically movable in suitable ways and having a central aperture in which is inserted a short tube, a friction-roller rotatably mounted on a projection of said slide, a shaft passing through said tube but of a less diameter than said tube, a cam rotatably mounted on said shaft and having working edges adapted to contact with said friction-roller for the purpose of vertically moving said slide and also having a pivotal connection with the rear end of said swinging bar, a spring adapted to give a return movement to said cam, a gear loosely mounted on said tube, means between said cam and gear adapted to impart a rotary movement from the former to the latter, a spring adapted to give a return movement to said gear, a properly-mounted shaft, a gear loose on the last-named shaft engageable with the first-named gear, a cylindrical indicating-dial loosely mounted on the last-named shaft and connected with and movable by the second-named gear, a register-pulley loosely mounted on the first-named shaft and provided with ratchet-teeth on a portion of its periphery, means between said first-named gear and said pulley adapted to impart a rotary movement from the former to the latter, a third shaft properly mounted, a key-register dial having a hub loosely mounted on the last-named shaft, a spiral spring on said hub adapted to turn the same, a pulley on said hub, a belt passing over said pulleys, a centrally-mounted bent pawl engageable at its front end with the ratchet-teeth of the register-pulley and a reciprocating sliding bar with proper supports and having a lug against which said end of the key-lever is movable and engageable at its rear end by the upper end of said pawl, substantially as described.

6. In a calculating-machine, the combination of a pivotally-mounted key-lever having a downwardly-extending end, a reciprocating swinging bar pivotally connected at its front end with a properly-mounted rocker-arm and provided with a lug against which said end of the key-lever is movable, a slide vertically movable in suitable ways and having a central aperture in which is secured a short tube, a friction-roller rotatably mounted on a projection of said slide, a shaft passing through said tube but of a less diameter than said tube, a cam rotatably mounted on said shaft and having working edges adapted to contact with said friction-roller for the purpose of vertically moving said slide and also having a pivotal connection with the rear end of said swinging bar, a spring adapted to give return movement to said cam, a gear loosely mounted on said tube, means between said cam and gear adapted to impart a rotary movement from the former to the latter, a spring adapted to give return movement to said gear, a quadrant extending from said gear and movable with it and having ratchet-teeth on its periphery, a properly-mounted shaft, a gear loose on said last-named shaft engageable with the first-named gear, a cylindrical dial mounted on the last-named shaft and connected with and movable by the second-named gear, a reciprocating sliding bar with supports for the same and provided with a lug on its upper edge against which said end of the key-lever is movable and also provided with a lug on its lower edge, a centrally-mounted lever, having its upper end engageable with the last-named lug and its lower end engageable with the ratchet-teeth of said quadrant, a spring adapted to give return movement to said lever, a register-pulley loosely mounted on the first-named shaft and provided with ratchet-teeth on a portion of its periphery, means between said first-named gear and said pulley adapted to impart a rotary movement from the former to the latter, a third shaft properly mounted, a key-register dial having a hub mounted on the last-named shaft, a spiral spring on said hub adapted to return the same, a pulley on said hub, a belt passing over said pulleys, a centrally-mounted bent pawl engageable at its front end with the ratchet-teeth of the register-pulley and a reciprocating sliding bar with proper supports and having a lug against which said end of the key-lever is movable and engageable at its rear end by the upper end of said pawl, substantially as specified.

7. In a calculating-machine, the combination of a pivotally-mounted key-lever having a downwardly-extending end, a reciprocating swinging bar pivotally connected at its front end with a properly-mounted rocker-arm and provided with a lug against which said end of the key-lever is movable, a slide vertically movable in suitable ways and having a central aperture in which is secured a short tube, a friction-roller rotatably mounted on a projection of said slide, a shaft passing through said tube but of a less diameter than said tube, a cam rotatably mounted on said shaft and having working edges adapted to contact with said friction-roller for the purpose of vertically moving said slide and also having a pivotal connection with the rear end of said swinging bar, a spring adapted to give return movement to said cam, a gear loosely mounted on said tube, means between said cam and gear adapted to impart a rotary movement from the former to the latter, a spring adapted to give return movement to said gear, a quadrant extending from said gear and movable with it and having ratchet-teeth on its periphery, a properly-mounted shaft, a gear loose on said last-named shaft engageable with the first-named gear, a cylindrical dial mounted on the last-named shaft and connected with and movable by the second-named gear, a reciprocating sliding bar with supports for the same and provided with a lug on its upper edge against which said end of the key-lever is movable and also provided with a lug on its lower edge, a centrally-mounted lever, having its upper end engageable with the last-named lug and its lower end engageable with the ratchet-teeth of said quadrant, a spring adapted to give return movement to said lever, a stop-pin fixed in position to limit the return movement of said lever, a projection on said vertical slide and a set-screw passing through said projection and having its end abutting said quadrant, substantially as shown.

8. In a calculating-machine, the combination of a pivotally-mounted key-lever having a downwardly-extending end, a reciprocating swinging bar with proper supports for the same and provided with a lug against which said end of the key-lever is movable, a cam rotatably mounted on a proper support and connected with said bar so as to be movable thereby, a movable support having a portion thereof in operative contact with said cam, a gear mounted on said movable support, a properly-mounted shaft, a gear on said shaft engageable with the first-named gear and a cylindrical dial mounted on said shaft and connected with and movable by the second-named gear, substantially as shown.

9. In a calculating-machine, the combination of a pivotally-mounted key-lever having a downwardly-extending end, a reciprocating swinging bar pivotally connected at its front end with a properly-mounted rocker-arm and provided with a lug against which said end of the key-lever is movable, a cam rotatably mounted on a fixed support and pivotally connected with the rear end of said swinging bar, a vertically-movable supporting-piece having suitable guides and a projection in contact with the working face of said cam, a gear mounted on said vertically-movable supporting-piece and means to rotate said gear, a properly-mounted shaft, a gear on said shaft engageable with the first-named gear when said movable supporting-piece is in its elevated position, a cylindrical dial loosely mounted on said shaft and movable by the second-named gear, a ratchet-gear fast on said shaft and a spring-pressed pawl pivotally mounted and engageable with said ratchet-gear, substantially as set forth.

10. In a calculating-machine, the combination of a pivotally-mounted key-lever having a downwardly-extending end, a reciprocating swinging bar pivotally connected at its front end with a properly-mounted rocker-arm and provided with a lug against which said end of the key-lever is movable, a slide vertically movable in suitable ways and having a central aperture in which is secured a short tube, a stop-pin extending from said slide in the upper portion thereof, a friction-roller rotatably mounted on a projection of said slide, a shaft passing through said tube but of less diameter than said tube, a cam rotatably mounted on said shaft and having working edges adapted to contact with said friction-roller for the purpose of vertically moving said slide and also having a pivotal connection with the rear end of said swinging bar, a spring adapted to give return movement to said cam, a gear loosely mounted on said tube, means between said cam and gear adapted to impart a rotary movement from the former to the latter, a spring adapted to give return movement to said gear, a properly-mounted shaft, a gear loose on said last-named shaft engageable with the first-named gear, a cylindrical dial mounted on the last-named shaft and movable by the second-named gear, a ratchet-gear mounted fast on the last-named shaft, a pivotally-mounted spring-pressed pawl engageable with said ratchet-gear, a ratchet-gear mounted on the last-named shaft and secured to the second-named gear, a pivotally-mounted spring-pressed pawl engageable with the last-named ratchet-gear and having an arm whose end rests upon the said stop-pin of the slide, substantially as specified.

11. In a calculating-machine, the combination of two cylindrical indicating-dials mounted upon one shaft and a series of key-levers for each of said dials, each key of the series being adapted to impart independent, intermittent rotary motion to its respective companion dial, a curved slide movable on suitable ways and provided with a projection, an eccentric cam mounted on said shaft and connected with and movable by one of said dials, the edge of which cam is arranged to bear against said projection and to move said curved slide thereby, a ratchet-gear mounted on said shaft and connected and movable with the other of said dials, a parallel pawl connected with and movable by said curved slide and having its end in engagement with said ratchet-gear, and a spring adapted to give a return movement to said curved slide, substantially as specified.

12. In a calculating-machine, the combination of two cylindrical indicating-dials mounted upon one shaft and a series of key-levers for each of said dials, each key of the series being adapted to impart independent, intermittent rotary motion to its respective companion dial, a curved slide movable on suitable ways and provided with a projection, an eccentric cam mounted on said shaft and connected with and movable by one of said dials, the edge of which cam is arranged to bear against said projection and to move said curved slide thereby, a ratchet-gear mounted on said shaft and connected with the other of said dials, a parallel pawl connected with said curved slide by a screw, whose head projects beyond the plane of said pawl, which said pawl is arranged to have its end in engagement with said ratchet-gear and adapted to give a forward movement thereto by the force of said spring, and a locking-pawl, spring-pressed and pivotally mounted, whose end is in engagement with said ratchet-gear and adapted to prevent the reverse movement thereof and which has an arm extending to a position where its end is engageable with said projecting screw-head, substantially as described.

13. In a calculating-machine, the combination of a quadrant-slide pivotally mounted and provided with two radial arms and a knob, a central radial projection of said quadrant-slide between said arms thereof, a quadrant-gear pivotally mounted concentrically with said quadrant-slide and having two radial arms with which alternately said projection of the quadrant-slide is engageable, a series of cylindrical indicating-dials, a properly-mounted shaft on which said dials are rotatably mounted and which is provided with a longitudinal groove, a series of gears mounted on said shaft and respectively connected with and movable by the adjacent cylindrical dial, a gear fastened upon said shaft and engageable with said quadrant-gear, a hub for each of said cylindrical dials and provided with an aperture, a spring-pressed pawl pivotally mounted on the inner face of each of said dials, which pawl extends at an angle along said face with its free end engageable with the groove of the shaft through said aperture of the dial-hub and a spring adapted to give return movement to said slide, substantially as shown.

14. In a calculating-machine, the combination of a pivotally-mounted quadrant-slide having a knob and also a radial projection, a quadrant-gear mounted concentrically with said quadrant-slide and having two radial arms with which alternately the projection of the quadrant-slide is engageable, a plurality of cylindrical indicating-dials, a longitudinally-grooved shaft on which said dials are loosely mounted, a gear for each of said dials, respectively, and connected and movable with it, a gear fastened on the end of said shaft, a hub for each of said dials and provided with an aperture, a spring-pressed pawl for each of said dials mounted on the inner face thereof and engageable with said grooved shaft through said aperture, a spring adapted to give return motion to said slide, a spring-pressed pawl mounted on the radial projection of the slide, a four-armed cam mounted concentrically with said quadrant slide and gear and with which the last-named pawl is engageable, a centrally-mounted bent lever having one portion of its edge adapted as a cam-surface against which said four-armed cam is movable, a flat rock-shaft properly mounted and having a disk at its end and also an arm with a recess into which the upper end of said bent lever extends, a spring adapted to give reverse motion to said arm, a ratchet-gear on each of said dial-hubs, a spring-pressed locking-pawl for each of said ratchet-gears and provided with an angular arm whose end is in contact with said flat rock-shaft, a second flat rock-shaft properly mounted having a disk at its end and also an arm and a recess in which the lower end of said bent lever enters, a spring adapted to give reverse movement to said arm, a plurality of register-pulleys rotatably mounted on a proper support, each having ratchet-teeth on a portion of its periphery, a centrally-pivoted bent pawl for each of said register-pulleys whose upper end bears against said second flat rock-shaft and whose lower end is engageable with said ratchet-teeth, a key-register dial for each of said register-pulleys mounted on a shaft and having a pulley connected therewith and a spring adapted to give reverse movement and a belt passing over each register-pulley and the pulley of its companion key-register dial, substantially as shown.

15. In a calculating-machine, the combination of a pivotally-mounted quadrant-slide having a knob and also a radial projection, a spring adapted to give reverse movement to said slide, a four-armed cam mounted concentrically with said slide, a spring-pressed pawl pivoted to said projection of said slide and engageable with said cam, a centrally-pivoted bent lever having one portion of its edge adapted as a cam-surface against which said four-armed cam is movable, a flat rock-shaft properly mounted and having a disk at its end and also an arm with a recess into which the upper end of said bent lever extends, a spring adapted to give reverse movement to said arm, a plurality of register-pulleys rotatably mounted on a proper support and each having ratchet-teeth on a portion of its periphery, a centrally-mounted bent pawl for each of said register-pulleys and having its upper end bearing against said flat rock-shaft and its lower end engageable with the ratchet-teeth of its companion register-pulley, a key-register dial for each of said register-pulleys mounted on a shaft and provided with a spring adapted to give reverse movement to said dial and also having a pulley and a belt passing over said dial-pulley and over its companion register-pulley, substantially as described.

16. In a calculating-machine, having two cylindrical indicating-dials mounted upon a shaft and a series of key-levers adapted to impart independent, intermittent, rotary motion to said dials, the combination therewith of a curved slide movable on suitable ways and provided with a projection, an eccentric cam fastened on said shaft and connected with and movable by one of said dials, the edge of which cam is arranged to bear against said projection and to move said slide thereby, a spring adapted to give a return movement to said slide, a ratchet-gear mounted on said shaft and connected with and movable by the other of said dials, a parallel pawl pivotally connected near its center with said slide by a screw, which pawl has its free end in engagement with said ratchet-gear, a spring-actuated flat rock-shaft properly mounted and having one of its broad faces in contact with the rear end of said pawl and means adapted to oscillate said flat shaft, substantially as set forth.

17. In a calculating-machine, the combination of key-levers arranged in a row, a pulley mounted on a shaft and rotatable thereon to different degrees in one direction by said key-levers, respectively, a spring adapted to impart a reverse rotation to said pulley, a key-register dial mounted on a fixed shaft and provided with a pulley, a band adapted to communicate rotary motion in one direction to the last-named pulley from the first-named pulley, a spring arranged to give a reverse rotary motion to said key-register-dial pulley, a case having a horizontal slot, two circumferential rows of numerals on said key-register dial, one for the purpose of addition and one for the purpose of subtraction, a slide movable on suitable ways over said slot and provided with a sight-aperture so arranged and located that a numeral of either of said circumferential rows upon the key-register dial is displayed through said sight-aperture, according to the position of the slide and of said key-register dial, substantially as specified.

18. In a calculating-machine for problems in both addition and subtraction, the combination of two rotatable, adjacent, indicating-dials, a properly-mounted pawl movable by means between it and one of said dials and arranged to give an intermittent forward movement to the other of said dials for the purpose of carrying in addition the tenth unit over from the first dial to the second and a tripping device arranged to disengage said pawl, when the machine is used for the purpose of subtraction, substantially as described.

19. In a calculating-machine having two cylindrical indicating-dials mounted on a shaft and a series of key-levers adapted to impart independent, intermittent, rotary motion to said dials, the combination therewith of a curved slide movable on suitable ways and provided with a projection, an eccentric cam fastened on said shaft and connected with and movable by one of said dials, the edge of which cam is arranged to bear against said projection and to move the slide thereby, a spring adapted to give a return movement to said slide, a ratchet-gear mounted on said shaft and connected with and movable by the other of said dials, a parallel pawl pivotally connected near its center with said slide by a screw, which pawl has its free end in engagement with the ratchet-gear, a spring-actuated flat rock-shaft properly mounted and having one of its broad faces in contact with the rear end of said pawl, a two-notched disk, on the end of said flat rock-shaft, with two stop-surfaces, a stop-pin with which said stop-surfaces are alternately in contact, a spring adapted to engage either of the notches of said disk when the latter is turned, and a handle adapted to turn said disk, substantially as shown.

20. In a calculating-machine having two cylindrical indicating-dials mounted on a shaft and a series of key-levers adapted to impart independent, intermittent, rotary motion to said dials, the combination therewith of a curved slide movable on suitable ways and provided with a projection, an eccentric cam fastened on said shaft and connected with and movable by one of said dials, the edge of which cam is arranged to bear against said projection and to move the slide thereby, a spring adapted to give a return movement to said slide, a ratchet-gear mounted on said shaft and connected with and movable by the other of said dials, a parallel pawl pivotally connected near its center with said slide by a screw, which pawl has its free end in engagement with the ratchet-gear, a spring-actuated flat rock-shaft properly mounted and having one of its broad faces in contact with the rear end of said pawl, a pivotally-mounted disk adapted to turn said flat rock-shaft and having two projections, a stop-pin with which said projections are alternately in contact, and a spring adapted to engage said disk at either limit of its movement, substantially as described.

21. In a calculating-machine operated by a series of key-levers, arranged in several rows, the combination therewith of cylindrical indicating-dials rotatably mounted on a shaft, one of said indicating-dials for each row of key-levers, mechanism actuated by each key-lever of a row adapted to rotate the companion indicating-dial of that row, means between each indicating-dial and its next left-hand indicating-dial of the series adapted to advance the latter-named indicating-dial one space upon the completion of each revolution of the former, a rotatable key-register dial for each row of key-levers loosely mounted on a fixed shaft, a pulley for each row of key-levers mounted on a shaft and rotatable thereon to different degrees in one direction by the key-levers, respectively, of that row, a spring adapted to impart a reverse rotation to said pulley, a pulley on the key-register dial on said row, a band adapted to communicate rotary motion in one direction to the last-named pulley from the first-named pulley, a spring arranged to give a reverse rotary motion to said key-register-dial pulley, a setback mechanism adapted to return all the indicating-dials simultaneously to their starting position and a setback mechanism adapted to return all the key-register dials simultaneously to their starting position, substantially as described.

22. The setback mechanism herein described for separately reversing the register-dials of a calculating-machine, consisting of the combination of a series of register-pulleys rotatably mounted on a proper support and each having ratchet-teeth on its periphery, a series of bent pawls pivotally mounted near the center thereof to a proper support and the forward ends of which are, respectively, engageable with said ratchet-teeth, a series of key-register dials having hubs mounted on a shaft, a spiral spring on each of said key-register-dial hubs adapted to give a return movement to such dial, a belt passing around each of said register-pulleys upon a circumferential flange thereof and wound around each of said key-register-dial hubs, respectively, a flat rock-shaft properly mounted against which the rear ends of said bent pawls are adapted to contact, a lever-arm at the end of said flat rock-shaft, a bent lever centrally pivoted upon a proper support and provided with a spring to give return movement, a rod from the lower end of the last-named bent lever to the lower end of the lever-arm at the end of the flat rock-shaft, a bent key-lever centrally mounted near one side of the machine on a proper support and adapted to move the bent lever last before named, a bent key-lever mounted near the opposite side of the machine and a key-bar extending from one bent key-lever to the other, substantially as described.

23. In a calculating-machine having register-dials, the combination therewith of two bent key-levers pivotally mounted on opposite sides of the machine, with a key-bar extending between them and means between said key-levers and dials to reverse the movement of the dials, substantially as shown and for the purpose specified.

24. In a calculating-machine, the combination of a rotatable gear loosely mounted on a fixed shaft, a cylindrical dial loosely mounted on said shaft and connected and movable with said gear, a slide movable in two straight and parallel guideways which overlap the two vertical edges of said slide, a gear rotatably mounted on said slide and movable therewith to engage with the first-named gear and to disengage therefrom, a key-lever and means between said key-lever and slide adapted to communicate motion from the former to the latter and a case having a sight-aperture contiguous to said dial and arranged to display one-tenth of the periphery of said dial therethrough, the distance between said dial and sight-aperture being constant, substantially as shown.

25. In a calculating-machine, the combination of nine pivotally-mounted key-levers, each having a downwardly-extending end, a cam rotably mounted on a proper support, a reciprocating bar supported at its forward end and pivotally connected at its rear end to said cam and provided with nine lugs on its edge, with which, respectively, the downwardly-extending ends of said key-levers are adapted to contact, and which lugs are relatively-increasing distances apart *seriatim* from front to rear, a spring adapted to give return movement to said cam, a gear mounted concentrically with said cam and movable therewith, a properly-mounted shaft, a gear on said shaft engageable with the first-named gear, a cylindrical dial mounted on said shaft and connected with and movable by the second-named gear, a quadrant extending from and movable with the first-named gear and having nine ratchet-teeth on its periphery, a sliding bar with proper supports and provided with nine equidistant lugs on its upper edge, with which the downwardly-extending ends of said key-levers, respectively, are engageable, and a spring-actuated lever centrally mounted, having its upper end engageable with a lug on the lower edge of said sliding bar and at its lower end engageable with the ratchet-teeth of said quadrant, substantially as and for the purpose specified.

26. In a calculating-machine, the combination of a rotatable gear, a cylindrical dial mounted on a shaft and rotatable thereon by said gear, a properly-mounted vertically-movable support, a disk rotatably mounted on said support and having a certain circumferential portion thereof provided with gear-teeth engageable with the first-named gear and also having another certain circumferential portion of a larger radius provided with ratchet-teeth, a pawl adapted to engage said ratchet-teeth and to withdraw therefrom, a key-lever and means actuated thereby for the purpose of operating said vertically-movable support and pawl, substantially as described.

27. In a calculating-machine, the combination of a rotatable gear, a cylindrical dial mounted on a shaft and rotatable thereon by said gear, a properly-mounted vertically-movable support, a gear rotatably mounted on said support and movable therewith so as to engage the first-named gear, a key-register dial mounted rotatably on a shaft and having a spring adapted to give it reverse motion, a register-pulley mounted rotatably upon a shaft and having ratchet-teeth on a portion of its periphery and movable forward by said second-named gear through intermediate means, a pulley connected with said register-dial and concentric therewith, a belt passing over the register-pulley and the key-register-dial pulley, a properly-mounted pawl engageable with said ratchet-teeth, a reciprocating sliding bar engageable at its rear end with said pawl, a key-lever adapted to move said sliding bar and also provided with means to communicate motion to said vertical support, substantially as specified.

28. In a calculating-machine, the combination of a rotatable gear, a cylindrical dial mounted on a shaft and rotatable thereon by said gear, a properly-mounted vertically-movable support, a disk rotatably mounted on said support and having a certain circumferential portion thereof provided with gear-teeth engageable with the first-named gear and also having another certain circumferential portion of a larger radius provided with ratchet-teeth, a pawl adapted to engage said ratchet-teeth and to withdraw therefrom, a key-register dial mounted rotatably on a shaft and having a spring adapted to give it reverse motion, a register-pulley mounted rotatably on a shaft and having ratchet-teeth on a portion of its periphery and movable forward by said second-named gear through intermediate means, a pulley connected with said key-register dial and concentric therewith, a belt passing over said register-pulley and said key-register-dial pulley, a properly-mounted pawl adapted to engage with and disengage from said ratchet-teeth of the register-pulley, a reciprocating sliding bar engageable at its rear end with said pawl, a key-lever adapted to move said sliding bar and also provided with means to communicate motion to said vertically-movable support, substantially as described.

29. In a calculating-machine, the combination of key-levers, a series of cylindrical indicating-dials mounted rotatably on a shaft, a ratchet-gear for each cylindrical dial connected therewith and mounted loosely on said shaft, means actuated by the key-levers and adapted to rotate said dials, a curved slide accompanying each cylindrical dial and movable on suitable guideways, a cam for each curved slide, fastened on said shaft, rotatable therewith and adapted to operate its said companion curved slide, a spring for each curved slide, a pawl pivoted on each curved slide bent so as to engage and move forward the ratchet-gear of the next adjacent cylindrical dial of the series and constituting a carrying mechanism, and an arm from said pawl engageable with the same ratchet-gear and adapted to hold said gear from reverse movement, substantially as specified.

In testimony whereof I affix my signature in presence of two witnesses.

JOSEPH A. TURCK.

Witnesses:
WARREN R. PERCE,
HOWARD A. LAMPREY.